(12) United States Patent
Matheis et al.

(10) Patent No.: US 10,010,830 B2
(45) Date of Patent: Jul. 3, 2018

(54) BIOFILTER WITH FUZZY LOGIC CONTROL

(71) Applicant: Evoqua Water Technologies LLC, Warrendale, PA (US)

(72) Inventors: Timothy Frank Matheis, Palmetto, FL (US); Eric C. Hansen, Bradenton, FL (US); Yunjie Zhang, Sarasota, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/407,050

(22) Filed: Jan. 16, 2017

(65) Prior Publication Data

US 2017/0120190 A1    May 4, 2017

Related U.S. Application Data

(62) Division of application No. 14/523,303, filed on Oct. 24, 2014, now Pat. No. 9,586,176.

(60) Provisional application No. 61/895,645, filed on Oct. 25, 2013.

(51) Int. Cl.
| | |
|---|---|
| *B01D 53/84* | (2006.01) |
| *B01D 53/34* | (2006.01) |
| *C02F 3/34* | (2006.01) |
| *G05B 15/02* | (2006.01) |
| *B01D 53/52* | (2006.01) |
| *C02F 101/10* | (2006.01) |
| *C02F 103/00* | (2006.01) |

(52) U.S. Cl.
CPC ........... *B01D 53/84* (2013.01); *B01D 53/346* (2013.01); *B01D 53/52* (2013.01); *C02F 3/345* (2013.01); *G05B 15/02* (2013.01); *B01D 2251/95* (2013.01); *C02F 2101/101* (2013.01); *C02F 2103/005* (2013.01); *C02F 2209/006* (2013.01); *C02F 2209/06* (2013.01); *C02F 2209/265* (2013.01); *C02F 2303/02* (2013.01); *G05B 2219/40585* (2013.01)

(58) Field of Classification Search
CPC ...... B01D 53/84; B01D 53/346; B01D 53/52; B01D 2251/95; G05B 15/02; G05B 2219/40585; C02F 3/345; C02F 2103/005; C02F 2303/02; C02F 2209/06; C02F 2209/006; C02F 2101/101
USPC ........ 210/614, 620, 143; 95/9, 45, 135, 136, 95/137; 96/109, 115
See application file for complete search history.

(56) References Cited

U.S. PATENT DOCUMENTS

| | | |
|---|---|---|
| 5,133,875 A | 7/1992 | Carnahan |
| 5,826,251 A | 10/1998 | Kiendl |
| 5,831,850 A | 11/1998 | Chebre |
| 5,833,766 A | 11/1998 | Osterwald et al. |
| 6,013,512 A | 1/2000 | Turschmid et al. |

(Continued)

OTHER PUBLICATIONS

Kaehler, Steven "Fuzzy Logic—An Introduction" http://www.seattlerobotics.org/encoder/dec97/fuzzy.html, 1998, 8 pages.

(Continued)

*Primary Examiner* — Fred Prince

(57) ABSTRACT

A system for removing undesirable compounds from contaminated air includes a biofilter having a fuzzy logic based controller. A contaminant, such as hydrogen sulfide, is removed from contaminated air by passing the contaminated air through the biofilter.

15 Claims, 9 Drawing Sheets

(56) References Cited

U.S. PATENT DOCUMENTS

| | | | |
|---|---|---|---|
| 6,093,322 A * | 7/2000 | Bongards | C02F 3/006 |
| | | | 210/614 |
| 8,772,015 B2 | 7/2014 | Husain et al. | |
| 2001/0005525 A1 | 6/2001 | Scheufler et al. | |
| 2004/0152185 A1 | 8/2004 | Egan | |
| 2007/0084795 A1 | 4/2007 | Jordan | |
| 2007/0180802 A1 | 8/2007 | Parker et al. | |
| 2008/0245232 A1 * | 10/2008 | Getz | B01D 53/84 |
| | | | 95/93 |
| 2008/0308493 A1 | 12/2008 | Amir et al. | |
| 2010/0129895 A1 | 5/2010 | Crawford | |
| 2014/0052422 A1 * | 2/2014 | Wan | C02F 3/006 |
| | | | 703/2 |

OTHER PUBLICATIONS

Internet Archive WaybackMachine http://web.archive.org/web/20000601000000*/http://www.seattlerobotics.org/encoder/dec97/fuzzy. html, 1998, 1 page.

* cited by examiner

BIOFILTER WITH FUZZY LOGIC CONTROL

CROSS-REFERENCE TO RELATED APPLICATIONS

This application is a divisional application of and claims the benefit under 35 U.S.C. § 120 to co-pending U.S. patent application Ser. No. 14/523,303, titled BIOFILTER WITH FUZZY LOGIC CONTROL, filed on Oct. 24, 2014, which claims the benefit of U.S. Provisional Application No. 61/895,645, filed Oct. 25, 2013, titled "FUZZY LOGIC CONTROL OF pH ON A BIOTRICKLING FILTER," each of which is incorporated herein by reference in its entirety for all purposes.

BACKGROUND

Field

Aspects and embodiments disclosed herein are directed to treatment of air streams, and more particularly, to systems and methods for removing odor causing compounds from air streams.

Discussion of Related Art

Sewage systems typically include conduits that collect and direct sewage and other waste streams, such as industrial effluents, to a treatment facility. Such systems typically include various pumping facilities, such as lift stations, that facilitate the transfer of wastewater to such treatment facilities. During transit odorous species are often generated. Such odorous species may be objectionable when released or discharged. Untreated sewage may generate multiple odor-causing compounds. One of the most prevalent and most distinctive compounds formed is hydrogen sulfide ($H_2S$). Other objectionable or odor-causing compounds from contaminated air streams may include compounds resulting from the volatilization of reduced sulfur compounds in a sewage or wastewater stream such as any one or more of carbon disulfide, dimethyl sulfide, dimethyl disulfide, dimethyl trisulfide, methyl mercaptans, ethyl mercaptans, butyl mercaptans, allyl mercaptans, propyl mercaptans, crotyl mercaptans, benzyl mercaptans, thiophenol, sulfur dioxide, and carbon oxysulfide.

SUMMARY

In accordance with an aspect of the present invention, there is provided a method of treating a contaminated air stream. The method comprises producing a treated airstream by passing the contaminated air stream through a biofilter; producing a treatment water effluent by flowing a treatment water through the biofilter; generating a plurality of measured parameter values by taking a plurality of measurements of a parameter of the treatment water effluent; producing a treatment water by adding at least one of nutrient and a portion of the treatment water effluent to a make-up water; controlling a rate of addition of make-up water to the biofilter with a fuzzy logic-based controller based on the plurality of measured parameter values; and introducing the treatment water to the biofilter.

In some embodiments, controlling the rate of addition of the make-up water further comprises operating a controller actuated valve positioned between a source of the make-up water and the biofilter.

In some embodiments, controlling the rate of addition of make-up water further comprises setting a set point for the parameter, an error range for the parameter, and an error-dot range for the parameter.

In some embodiments, controlling the rate of addition of the make-up water further comprises determining an error value based on a difference between one of the measured parameter values and the set point.

In some embodiments, controlling the rate of addition of the make-up water further comprises determining an error-dot value based on a measured rate of change of the error value.

In some embodiments, controlling rate of addition of the make-up water further comprises determining a first degree of membership of the error value in each of a plurality of fuzzy error sets, based on the error value, the set point, and the error range.

In some embodiments, controlling the rate of addition of the make-up water further comprises determining a second degree of membership of the error-dot value in each of a plurality of fuzzy error-dot sets, based on at least two error values and the error-dot range.

In some embodiments, controlling the rate of addition of the make-up water further comprises associating at least one of the first degree of membership of the error value in one of the plurality of fuzzy error sets and the second degree of membership of the error-dot value in one of the plurality of fuzzy error-dot sets with at least one fuzzy output set of a plurality of fuzzy output sets.

In some embodiments, the method further comprises determining a weighting value of each of the plurality of fuzzy output sets from the at least one of the first degree of membership of the error value in one of the plurality of fuzzy error sets and the second degree of membership of the error-dot value in one of the plurality of fuzzy error-dot sets by performing logical operations defined by a rule base associated with the fuzzy logic-based controller, each rule in the rule base associated with a single fuzzy output set of the plurality of fuzzy output sets.

In some embodiments, controlling the rate of addition of the make-up water further comprises generating an output value by calculating a weighted average of the plurality of fuzzy output sets.

In some embodiments, controlling the rate of addition of the make-up water further comprises controlling a degree to which the controller actuator valve is opened by generating an output signal based on the output value.

In some embodiments, the contaminated airstream comprises hydrogen sulfide and the measured parameter comprises a pH of the treatment water effluent.

In accordance with another aspect, there is provided a controller for a biofiltration system, the controller being configured to: receive a first input signal from a measurement device in the biofiltration system corresponding to a first measured value of an input parameter of the biofiltration system; calculate a first error value, the first error value being a first difference between the first input signal and a pre-determined set point for the input parameter; receive a second input signal from the measurement device in the biofiltration system later in time from the receipt of the first input signal, the second input signal corresponding to a second measured value of the input parameter; calculate a second error value, the second error value being a second difference between the second input signal and the pre-determined set point for the input parameter; calculate an error-dot value, the error-dot value being the difference between the second error value and the first error value divided by a time interval between the first measured value and the second measured value; determine a first degree of membership of the second error value in each of a plurality of error sets, wherein the first degree of membership is based on the second error value and a pre-determined error range; determine a second degree of membership of the error-dot value in each of a plurality of error-dot sets, wherein the second degree of membership is based on the error-dot value and a pre-determined error-dot range; determine an output control value based on a weighted average of one or more output set constants, each of the output set constants associated with an output set, a weighting of the output set constants based on the first degree of membership of the second error value in each of the plurality of error sets, the second degree of membership of the error-dot value in each of the plurality of error-dot sets, and a pre-determined rule set of conditional statements associating each output set with at least one of an error set and an error-dot set; and generate a control signal based on the output control value which regulates an output parameter of the biofiltration system.

In some embodiments, the output parameter comprises a rate of introduction of a make-up water to the biofiltration system.

In some embodiments, the control signal controls a valve regulating a rate of introduction of make-up water to the biofiltration system.

In some embodiments, the input parameter is a pH value of a treatment water effluent.

In some embodiments, the measurement device is a pH sensor.

In some embodiments, the input parameter is a hydrogen sulfide concentration at a contaminated air inlet of the biofiltration system.

In some embodiments, the input parameter is a hydrogen sulfide concentration at a treated air outlet of the biofiltration system.

In some embodiments, the output parameter comprises a rate of air flow through the biofiltration system.

In some embodiments, the control signal controls a blower regulating a rate of air flow through the biofiltration system.

In some embodiments, the input parameter is a nutrient concentration of a treatment water effluent.

In accordance with another aspect, there is provided a wastewater treatment system comprising: a contaminated air inlet in fluid communication with a treated air outlet; a media bed in fluid communication with and positioned between the contaminated air inlet and the treated air outlet; a sump configured and arranged to receive an effluent from the media bed; an effluent outlet in fluid communication with the sump; a source of make-up water at least periodically in fluid communication with the biofilter; and a control system including: a pH sensor configured and arranged to measure a pH of the effluent; a controller actuated valve positioned between the source of make-up water and the biofilter; and a fuzzy logic controller in communication with the pH sensor and the controller actuated valve and configured to provide an output signal to the controller actuated valve to regulate a rate of supply of make-up water to the biofilter in response to a plurality of input signals received from the pH sensor indicative of a pH of the effluent; and a liquid mixture inlet in fluid communication with the media bed.

In some embodiments, the pH sensor is positioned in one of the sump and the recycle flow line.

In some embodiments, the wastewater treatment system further comprises a drain outlet in fluid communication with the sump.

In some embodiments, the pH sensor is positioned in the drain outlet.

In accordance with another aspect, there is provided a method of improving the performance of an odor mitigation biofilter, the method comprising: replacing a manually operated make-up water flow control system of the biofilter with a fuzzy logic based control system configured to regulate flow of make-up water into the biofilter based upon one or more measured parameters of the biofilter, the replacement of the manually controlled make-up water flow control system with the fuzzy logic based control system causing a reduced range of fluctuation of pH within the biofilter over time and a reduced consumption of make-up water by the biofilter.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
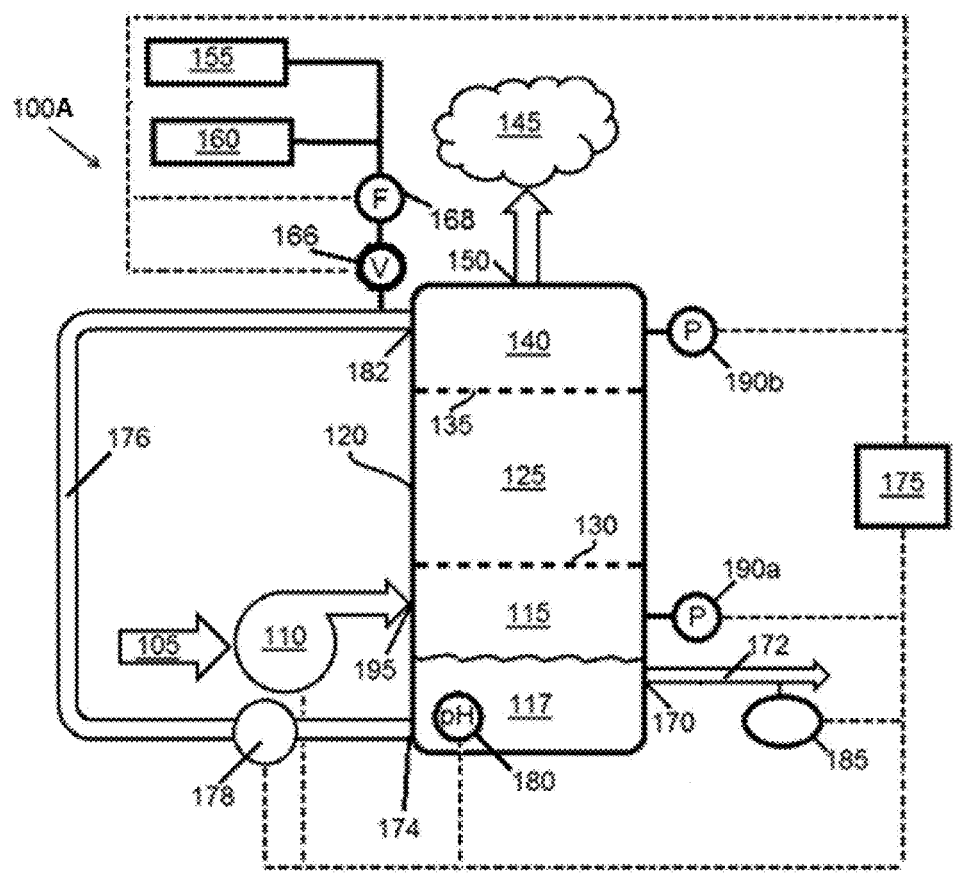
FIG. 1A is a schematic diagram of a biofilter for treating a contaminated air stream.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In wastewater treatment systems, various undesirable chemical species may be generated as discussed in the background section. Hydrogen sulfide is an example of such a species. Hydrogen sulfide is generated in some wastewater treatment systems and is considered an undesirable byproduct. Even small concentrations of $H_2S$ can negatively impact the air quality in the vicinity of a wastewater treatment plant or other components of a wastewater treatment system.

It is generally desirable to remove hydrogen sulfide from air streams from sewage systems, manhole headspaces, wastewater treatment systems, and/or other systems in which hydrogen sulfide may be generated. Aspects and embodiments disclosed herein include systems and methods for removing hydrogen sulfide from contaminated air streams. Aspects and embodiments disclosed herein may also be utilized to remove other objectionable and/or odor causing compounds from contaminated air streams, for example, compounds resulting from the volatilization of reduced sulfur compounds in a sewage or wastewater stream such as any one or more of carbon disulfide, dimethyl sulfide, dimethyl disulfide, dimethyl trisulfide, methyl mercaptans, ethyl mercaptans, butyl mercaptans, allyl mercaptans, propyl mercaptans, crotyl mercaptans, benzyl mercaptans, thiophenol, sulfur dioxide, and carbon oxysulfide, or hydrogen sulfide generated from any of these compounds by sulfate reducing bacteria. For the sake of simplicity, however, aspects and embodiments disclosed herein will be described as removing hydrogen sulfide from contaminated gas streams.

Hydrogen sulfide may be formed in wastewater streams by the conversion of sulfates to sulfides by sulfide reducing bacteria (SRBs) under anaerobic conditions. Hydrogen sulfide is dissolvable in water (up to about 0.4 g/100 ml at 20° C. and 1 ATM). In water, hydrogen sulfide exists in equilibrium with the bisulfide ion, $HS^-$, and the sulfide ion, $S^{2-}$. Unlike sulfide and bisulfide, hydrogen sulfide is volatile, with a vapor pressure of about $1.56 \times 10^4$ mm Hg (2.1 MPa) at 25° C., and may emerge from aqueous solution to form gaseous hydrogen sulfide. The presence of hydrogen sulfide in sewer systems is undesirable due to its offensive odor, toxicity, and corrosivity.

Gaseous hydrogen sulfide exhibits a characteristic unpleasant odor suggestive of rotten eggs. Humans can detect this odor at hydrogen sulfide concentrations as low as four parts per billion (ppb). Hydrogen sulfide is considered toxic. Extended exposure to a few hundred ppm can cause unconsciousness and death. Accordingly, the presence of hydrogen sulfide in sewer systems is found objectionable to people who may come into contact with the gaseous effluent from such sewer systems.

Hydrogen sulfide also supports the growth of organisms such as *thiothrix* and *beggiatoa*. These are filamentous organisms which are associated with bulking problems in activated sludge treatment systems.

Various methods and apparatuses are used to control $H_2S$ emissions. One such apparatus is a biofilter. A biotrickling filter is one kind of biofilter. A biotrickling filter utilizes a population of hydrogen sulfide oxidizing bacteria to remove hydrogen sulfide from the vapor phase by converting it to sulfuric acid. The production of sulfuric acid lowers the pH of the biofilter bed. Constant dilution and recirculation of water over the bed facilitates stabilization and maintenance of the pH of the biofilter bed at a level conducive for the bacteria to thrive. Traditionally the introduction of fresh water, called make-up water, is done at a constant, unchanging flow set by a manually operated valve.

Hydrogen sulfide loadings change in a cyclical manner to reflect high and low usage of the sewage collection system throughout the day. This cyclical increase and decrease in hydrogen sulfide loadings is seen as cyclical rise and fall of in pH of the biofilter bed. By using a fixed flow rate of make-up water, the system is incapable of dynamically adjusting to the system. The result is that the flow of make-up water will at times be insufficient for meeting the demands of high loadings of $H_2S$ in the system, while at other times be excessive during low loadings of $H_2S$. This results in previously unappreciated problems such as difficulties in maintaining a desired pH in the system or removing a desired amount of $H_2S$. Further, using a fixed flow rate of make-up water to a biofilter, often results in a previously unappreciated significant amount of water waste. Further, it was not appreciated that a biofilter operating in a steady state would be responsive immediately to changes in operating conditions.

In various aspects and embodiments disclosed herein, a fuzzy logic controller is used to monitor the pH of drain water of a biofilter and dynamically adjust the flow of make-up water to the biofilter to stabilize operating parameters, for example, the pH within the biofilter. The disclosed fuzzy logic controller achieves a more precise and narrow control of pH within a specified range, by, for example, increasing make-up water flow during high $H_2S$ loadings, and decreasing or turning off make-up water flow during periods of low $H_2S$ loadings. This results in better control of the pH of the biofilter while using significantly less water.

A biofilter comprises a vessel packed with media. A source of liquid constituting a treatment water is sprayed on top of the media and this liquid trickles down through the media to a sump to become a treatment water effluent. In a biotrickling filter, at least some of this treatment water effluent is recirculated. By providing a moist environment, bacteria are encouraged to grow on the media. Air laden with $H_2S$ is introduced to the bottom of the vessel. As the air rises through the media, an exchange between the gaseous and liquid phase occurs where $H_2S$ is removed from the air, either by dissolving or direct biotreatment. Air, low in $H_2S$ concentration, exits the top of the vessel. Alternatively, top down air flow through the biofilter could be used.

During biotreatment, $H_2S$ is oxidized to $H_2SO_4$ or sulfuric acid. $H_2S$ or its ionic forms $HS^-$ or $S^{2-}$ are used as an energy source by litho-autotrophic bacteria such as *thiobacillus*. These bacteria require a carbon source which may be carbon dioxide or dissolved carbonate as well as organic carbon compounds. There are several possible intermediate sulfur species such as $S^0$, $S_2O_3^{2-}$, and $SO_3^{2-}$ that may be produced during the oxidation process. Their production depends on the $H_2S$ loading, pH, oxygen concentration, and temperature within the biofilter.

Thus, the use of a biofilter represents a continuous process to remove $H_2S$ from emissions from a wastewater stream by biotreatment. This biotreatment utilizes bacteria to oxidize the $H_2S$ to sulfuric acid and then flushes the sulfuric acid out of the system as a liquid solution.

Aspects and embodiments disclosed herein may remove hydrogen sulfide from a contaminated gas stream by the biological conversion of the hydrogen sulfide into less objectionable or less odorous compounds. In some embodiments, hydrogen sulfide oxidizing bacteria, for example, one or more of *ancalochloris beggiatoa, beggiatoa alba, sulfobacillus, thiobacillus denitrificans, thiohalocapsa halophila, thiomargarita*, or *thioploca* oxidize hydrogen sulfide into sulfuric acid ($H_2SO_4$). In some embodiments, the hydrogen sulfide oxidizing bacteria (referred to hereinafter as simply "bacteria"), are present on a media material disposed in a body of a biofilter. The bacteria may form a biofilm on surfaces of the media material. Contaminated air passed through the biofilter contacts the bacteria contained therein and the bacteria remove hydrogen sulfide from the contaminated air by oxidizing the hydrogen sulfide into sulfuric acid. In some embodiments, the biofilter is supplied with water and various nutrients, for example, nitrogen, potassium, and phosphorus compounds, to provide an environment within the biofilter conducive for the maintenance and/or growth of desirable bacteria populations. The supply of water and nutrients to the biofilter is, in some embodiments, controlled in response to the results of measurements of parameters including, for example, pH and nutrient concentration of liquid within various portions of the biofilter and/or of effluent or waste liquid drained from the biofilter.

In new installations, bacteria may migrate into a new biofilter along with water vapor from an environment in which the new biofilter is installed to establish a bacterial population effective for the removal of odorous compounds from contaminated air from the environment. The establishment of a sufficiently large bacterial population within the biofilter (referred to herein as "acclimation" of the biofilter) may take between about a few days and about a week. In some implementations, a biofilter may be "seeded" with desirable bacteria to shorten the time period required for the biofilter to acclimate.

One important aspect of the operation of biofilters is the control of the pH of the liquid in contact with the media. The pH may be measured in the effluent or blow-down or purge from the biofilter. For a given vessel, there is a range of pH that is conducive to acceptable operation. This pH may be in the range of from about 1.8 to about 2.2. It has been found that if the pH is too low, fouling of the media occurs. If the pH is too high, the removal efficiency of $H_2S$ drops. Thus, it is important to control the pH in the biofilter, for example, as determined by a measurement of pH of effluent from the biofilter. Normally, the pH is controlled by varying the rate of addition of make-up water to the biofilter. If the pH is too low, the flow rate of make-up water to the biofilter is increased. If the pH is too high, the flow rate of make-up water is decreased.

The control of the flow rate of make-up water into biofilters in prior known systems has been performed manually with infrequent adjustments to flow rate of the make-up water. This practice has often led to the problems discussed above. It has been discovered that methods of operation of a biofilter may be improved by using automated fuzzy logic control process that will control the effluent pH, for example, to maintain the effluent pH within a desired range. FIG. 1A illustrates one embodiment of a biofilter, indicated generally at 100A, for the treatment of contaminated air. The biofilter (also referred to as a biofiltration system) 100A is supplied with contaminated air 105, for example, air from the headspace of a sewage system or a wastewater treatment system. The contaminated air 105 contains unwanted or odorous compounds including, for example, hydrogen sulfide. While FIG. 1A is described with reference to hydrogen sulfide, the biofilter 100A may alternatively or additionally be used to mitigate other chemical species. The contaminated air 105 is blown through a blower 110 and through an air inlet 195 into a lower plenum 115 of a biofilter vessel 120. Alternatively or additionally, the contaminated air 105 may be pulled through the biofilter vessel 120 by a fan or blower located at an outlet 150 of the biofilter vessel 120. The contaminated air passes through the lower plenum 115 and into a media bed compartment 125 of the biofilter 100.

The media bed compartment 125 includes media, for example, particulate media, on which bacteria reside. The media is retained in the media bed compartment 125 by a lower screen 130 and, optionally, an upper screen 135. The contaminated air passing though the media bed compartment 125 contacts the media and the bacteria on the media and in the water in the media bed compartment 125. The bacteria in the media bed compartment 125 consume hydrogen sulfide in the contaminated air, removing the hydrogen sulfide from the contaminated air and converting the contaminated air into treated air.

The treated air passes through an upper plenum 140 of the biofilter 100A and is released to the external environment 145 or a polishing unit through the upper gas outlet 150 of the biofilter vessel 120. A lower portion of the plenum 115 may function as a sump 117 which may retain fluid draining from the media bed compartment 125. Sulfuric acid produced by the bacteria, water, unutilized nutrients, and other waste fluids exit the sump 117 through either a drain outlet 170 connected to drain line 172 or through an effluent outlet 174 connected to recycle line 176. Alternatively, a single effluent outlet connected to the sump 117 could deliver liquid both to the drain line and recycle line. The waste fluid in drain line 172 may be returned to a sewage system or wastewater treatment system from which the contaminated air was withdrawn or may be otherwise treated, for example, to neutralize the acid in the waste fluids, or disposed of. The effluent in the recycle line 176 may be returned to the vessel 120 via inlet.

The materials of construction of the biofilter vessel 120 are desirably resistant to attack by acid which is generated by the bacteria in the biofilter vessel 120. The walls of the biofilter vessel 120 and the upper and lower screens 130, 135 may be formed from, for example, fiberglass and/or an acid resistant polymer and/or may be coated with an acid resistant material.

Media used in the media bed compartment 125 of the biofilter vessel 120 may be composed of various organic and/or inorganic materials, including, for example, wood mulch, pine bark, gravel, pumice, expanded shale, fired clay, and polymeric open celled foam (referred to hereinafter as "traditional media materials").

Sintered glass ($SiO_2$) media, or other silica based media, may be utilized in place of traditional media materials in biofilters for the removal of odorous compounds, for example, hydrogen sulfide, from contaminated air. The characteristics of biofilter media are discussed in detail in U.S. patent application Ser. No. 14/270,461, entitled, "APPARATUS AND METHOD FOR SINTERED GLASS MEDIA BIOFILTER," which is incorporated herein by reference in its entirety and for all purposes.

To provide an environment conducive to the maintenance and/or growth of a desirable bacterial population within the biofilter 100, water from a source of water 155 and/or nutrients, for example, nitrogen, potassium, and/or phosphorus compounds from a source of nutrients 160 is introduced into the biofilter vessel 120 through an inlet 182 of the biofilter vessel 120. In some embodiments, the nutrients are supplied as an aqueous solution. The liquid entering through inlet 182 may generally be referred to as a treatment liquid.

The source of water 155 and the source of nutrients 160 are illustrated in FIG. 1A as being in fluid communication with the same inlet 182 of the biofilter vessel 120, but in other embodiments may be fluidly connected to different inlets of the biofilter vessel 120. Upon entering the biofilter vessel 120, the water and/or nutrients are distributed over the top of the media bed in the media bed compartment 125 by, for example, a fluid distributor, sprayer, or sprinkler (not shown). The water and/or nutrients are periodically or, alternatively, continuously provided to the media bed in the media bed compartment 125.

A portion of the fluid 117 in the sump of the biofilter vessel 120 may be recycled, for example, from lower fluid outlet 174 through recycle line 176 and pump 178 into an inlet 182 proximate an upper end of the biofilter vessel 120. Residual nutrients remaining in the fluid exiting the media bed 125 are thus re-introduced into the biofilter vessel 120, retaining the bioculture and reducing the need for "fresh" nutrients to be introduced into the biofilter vessel 120 from the source of nutrients 160, reducing operating costs of the biofilter 100A. Acid in the fluid exiting the media bed 125 is also re-introduced into the biofilter vessel 120, which may facilitate maintaining the pH within the media bed 125 and/or biofilter vessel 120 at a desired level. Water and/or nutrients from the source of water 155 and/or source of nutrients 160, respectively, may be introduced into the biofilter vessel 120 the same inlet 182 as the recycled liquid 117 and may be distributed onto the top of the media bed compartment 125 utilizing a common fluid distributor, sprayer, or sprinkler as the recycled liquid 117. Biofilters configured as illustrated in FIG. 1A may be referred to as trickling biofilters.

The source of make-up water 155 and/or source of nutrients 160 may be mixed with effluent in the recycle line 176 and delivered back to the vessel 120 via inlet 182. The biofilter 100A may be provided with one or more sensors which provide information to the controller 175. The controller 175 analyzes the information from the one or more sensors and adjusts a timing/and or rate of introduction of water and/or nutrients from the source of water 155 and/or source of nutrients 160, respectively, into the biofilter vessel 120 responsive to an analysis of the information.

In some embodiments, the controller 175 may also control a speed of the blower 110 responsive to an analysis of information provided from one or more sensors associated with the biofilter 100A, for example, a sensor providing information regarding a concentration of $H_2S$ exiting the biofilter 100A or a percent of $H_2S$ from contaminated air removed by the biofilter.

The biofilter 100A may include a pH sensor 180, which may be positioned at, for example, sump 117, and a nutrient concentration sensor 185 configured to measure the pH and a concentration of one or more components of a nutrient supplied to the biofilter 110, respectively, in fluid within and/or drained from the biofilter vessel 120 through either the drain line 172 or the recycle line 176. Sensor 185 is illustrated as coupled to the drain line 172 in FIG. 1A, but in other embodiments may be located or configured to measure parameters of fluid within the media bed 125, lower plenum 115, or other portions of the biofilter 100.

The pH measured by the pH sensor 180 may be utilized by the controller 175 to control a flow rate and/or frequency of the flow of water from the source of make-up water 155 into the biofilter vessel 120. Controlling the flow of make-up water may, in turn, aid in controlling the pH within the vessel 120. In some embodiments, it is desirable to maintain an acidic pH within the biofilter vessel 120. A pH of between about 0 and about 4 in the fluid within the biofilter vessel 120 and/or in the sump 117 may be indicative of a pH level within the biofilter vessel 120 conducive for hydrogen sulfide consuming bacteria to grow. More particularly, a pH between about 1.8 and about 2.2 may be desired. According to some embodiments a pH set point of about 2.0 may be desired.

One or more pH sensors 180 in communication with the controller 175 may be placed at various locations in the system to measure pH. For example, in FIGS. 1A and 1B the pH sensor 180 is located in sump 117. Alternatively or additionally, pH sensor 180 is positioned along the drain line 172 and/or positioned along recycle line 176.

The controller 175 may control the flow of water into the biofilter vessel 120 according to a fuzzy logic algorithm in response to the measurements of the pH sensor 180 as discussed in greater detail below. However, the controller 175 is not limited to using pH as an input parameter. Nor is the controller 175 limited to controlling the output parameter of water flow through the biofilter. Instead, the controller 175 may respond to other input parameters, including without limitation, pressure values, hydrogen sulfide concentrations in the air stream, nutrient concentration, and air flow or water flow values. The controller 175 may respond to input from any sensor of the system. Further, the controller 175 may be implemented to control any output parameter of the system, including without limitation, water flow rate of any system stream, air flow rate, and nutrient addition rate.

Figure 1B:
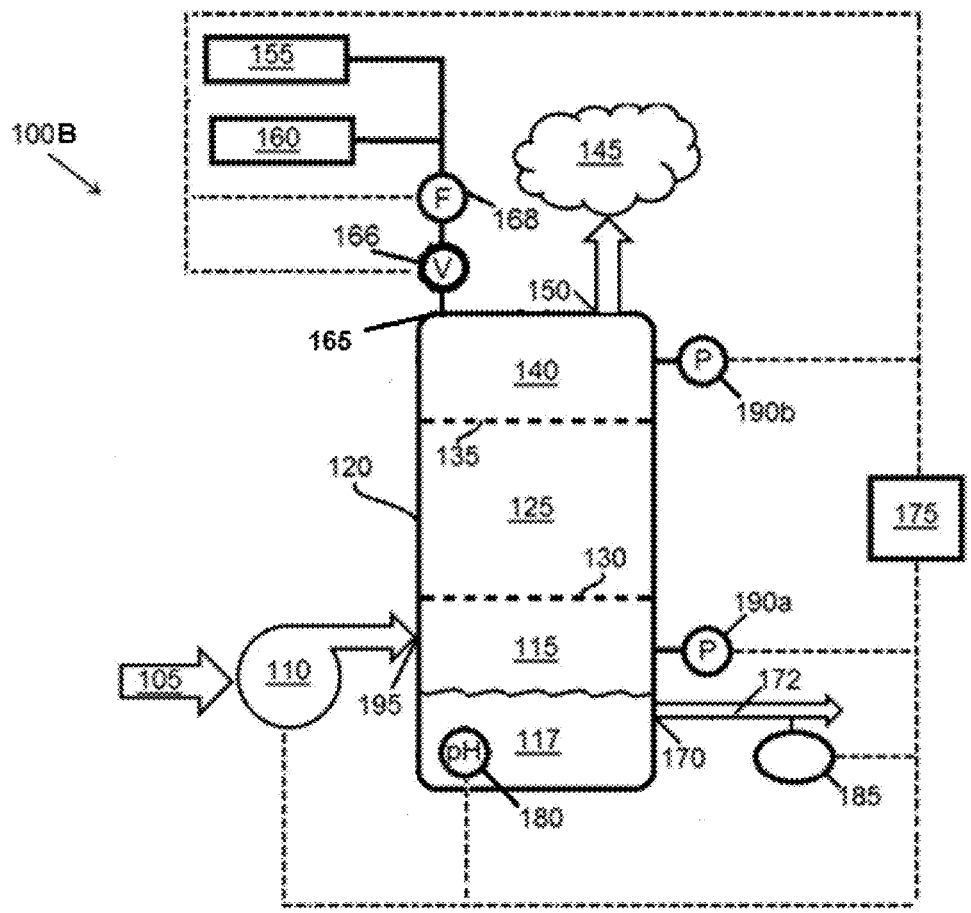
FIG. 1B is a schematic diagram of another biofilter for treating a contaminated air stream.

Another type of sensor that may be used in the system 100A or 100B includes one or more flow meters 168. For example, a flow meter 168 may be placed downstream of the make-up water feed 160 or the source of nutrients 155 to measure the flow of make-up water 160 or the flow from the source of nutrients 155. Alternatively or additionally, a flow meter 168 may be placed elsewhere, such as, for example, along recycle line 176 to measure the flow of effluent to be recycled. One or more controller actuator valves 166 may be positioned in the system to control flow through various flow lines in the biofilter 100A or 100B. The valve 166 may be opened and closed based on an output signal from controller 175 and may be designed for control of make-up water and/or nutrient flow rate by a current-controlled output signal from controller 175. As shown in FIG. 1A, the valve 166 may be positioned to regulate introduction of make-up water into recycle line 176. Alternatively or additionally, a valve 166 may be placed in the flow path of flow line 176 to regulate flow of recycled effluent. As shown in FIG. 1B, the valve 166 may be positioned between the make-up water feed 160 or the source of nutrients 155 and inlet 165. The liquid entering through inlet 165 may be generally referred to as a treatment liquid.

The nutrient concentration measured by the nutrient sensor 185 is utilized by the controller 175 to control a flow rate and/or frequency of the flow of nutrients from the source of nutrients 160 into the biofilter vessel 120. A nutrient concentration or a concentration of a component of nutrient supplied to the biofilter 100A or 100B below a lower threshold within the biofilter vessel 120 and/or exiting the drain 170 of the biofilter vessel 120 may be indicative of insufficient nutrients being supplied to the bacteria. A nutrient concentration or a concentration of a component of nutrient supplied to the biofilter 100A or 100B above an upper threshold in fluid within the biofilter vessel 120 and/or exiting the drain 170 of the biofilter vessel 120 may be indicative of an excessive amount of nutrients being supplied to the bacteria. The controller 175 may control the flow of nutrients into the biofilter vessel 120 according to a fuzzy logic algorithm in response to the measurements of the nutrient sensor 185, as discussed in greater detail below.

Pressure sensors 190a, 190b provide an indication of the differential pressure across the biofilter vessel 120 and/or media bed compartment 125. A pressure differential exceeding an upper threshold value, for example, between about two inches (5.1 cm) and about 10 inches (25 cm) of water (four degrees Celsius) (between about 498 Pascal and about 2,491 Pascal) may be indicative of the biofilter vessel 120 and/or media bed compartment 125 being blocked, for example, by contaminants or by over-packing of media in the media bed compartment 125. Responsive to the detection of a pressure differential exceeding an upper threshold, the controller 175 may increase the speed of the blower 110 to maintain an air flow through the biofilter vessel 120 within a desired range and/or may shut down the biofilter 100A or 100B and/or provide an indication to an operator that the biofilter 100A or 100B may be in need of service. A pressure differential which decreases over time may be indicative of the biofilter vessel 120 and/or media bed compartment 125 exhibiting channeling, for example, due to channels forming through the media bed and/or by poor distribution or mispacking of media in the media bed compartment 125. Responsive to the detection of a drop in the pressure differential, the controller 175 may shut down the biofilter 100A or 100B and/or provide an indication to an operator that the biofilter 100A or 100B may be in need of service.

In some embodiments, as illustrated in the biofilter generally indicated at 100B in FIG. 1B, which is substantially the same as biofilter 100A, the recycle line 176 of FIG. 1A is eliminated, and no fluid from the sump 117 of the biofilter vessel 120 is recycled. Instead, water and/or nutrients from the source of water 155 and/or source of nutrients 160, respectively, may be introduced into the biofilter vessel 120 through the inlet 165 and may be distributed onto the top of the media bed compartment 125 utilizing a fluid distributor, sprayer, or sprinkler (not shown). The following discussion applies equally to the both biofilters 100A and 100B.

The controller 175 used for monitoring and controlling operation of the biofilter 100A or 100B may include a computerized control system. Various aspects of the invention may be implemented as specialized software executing in a general-purpose computer system 200 such as that shown in FIG. 2. The computer system 200 may include a processor 202 connected to one or more memory devices 204, such as a disk drive, solid state memory, or other device for storing data. Memory 204 is typically used for storing programs and data during operation of the computer system 200. Components of computer system 200 may be coupled by an interconnection mechanism 206, which may include one or more busses (e.g., between components that are integrated within a same machine) and/or a network (e.g., between components that reside on separate discrete machines). The interconnection mechanism 206 enables communications (e.g., data, instructions) to be exchanged between system components of system 200. Computer system 200 also includes one or more input devices 208, for example, a keyboard, mouse, trackball, microphone, touch screen, and one or more output devices 210, for example, a printing device, display screen, and/or speaker.

The output devices 210 may also comprise valves, pumps, or switches which may be utilized to introduce water and/or nutrients from the source of water 155 and/or the source of nutrients 160 into the biofilter and/or to control the speed of a blower of the biofilter. One or more sensors 214 may also provide input to the computer system 200. These sensors may include, for example, pH sensor 180, nutrient sensor 185, pressure sensors 190a, 190b, sensors for measuring a concentration of an undesirable component of contaminated air, for example, $H_2S$, and/or other sensors useful in a biofilter system. These sensors may be located in any portion of a biofilter system where they would be useful, for example, upstream of a media bed, downstream of a media bed, in communication with a liquid waste outlet of a biofilter vessel, and/or in communication with an air or gas outlet of a biofilter vessel. In addition, computer system 200 may contain one or more interfaces (not shown) that connect computer system 200 to a communication network in addition or as an alternative to the interconnection mechanism 206.

Figure 3:
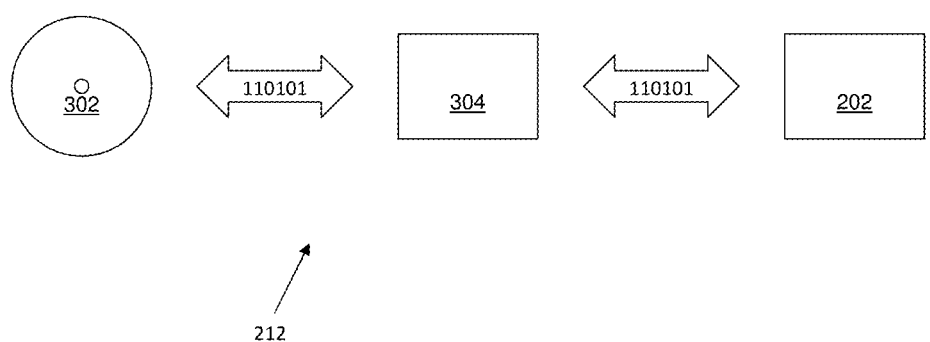
FIG. 3 is a block diagram of a memory system of the computer system of FIG. 2.

The storage system 212, shown in greater detail in FIG. 3, typically includes a computer readable and writeable nonvolatile recording medium 302 in which signals are stored that define a program to be executed by the processor or information to be processed by the program. The medium may include, for example, a disk or flash memory. Typically, in operation, the processor causes data to be read from the nonvolatile recording medium 302 into another memory 304 that allows for faster access to the information by the processor than does the medium 302. This memory 304 is typically a volatile, random access memory such as a dynamic random access memory (DRAM) or static memory (SRAM). It may be located in storage system 212, as shown, or in memory system 204. The processor 202 generally manipulates the data within the integrated circuit memory 204, 304 and then copies the data to the medium 302 after processing is completed. A variety of mechanisms are known for managing data movement between the medium 302 and the integrated circuit memory element 204, 304, and aspects and embodiments disclosed herein are not limited thereto. Aspects and embodiments disclosed herein are not limited to a particular memory system 204 or storage system 212.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 2:
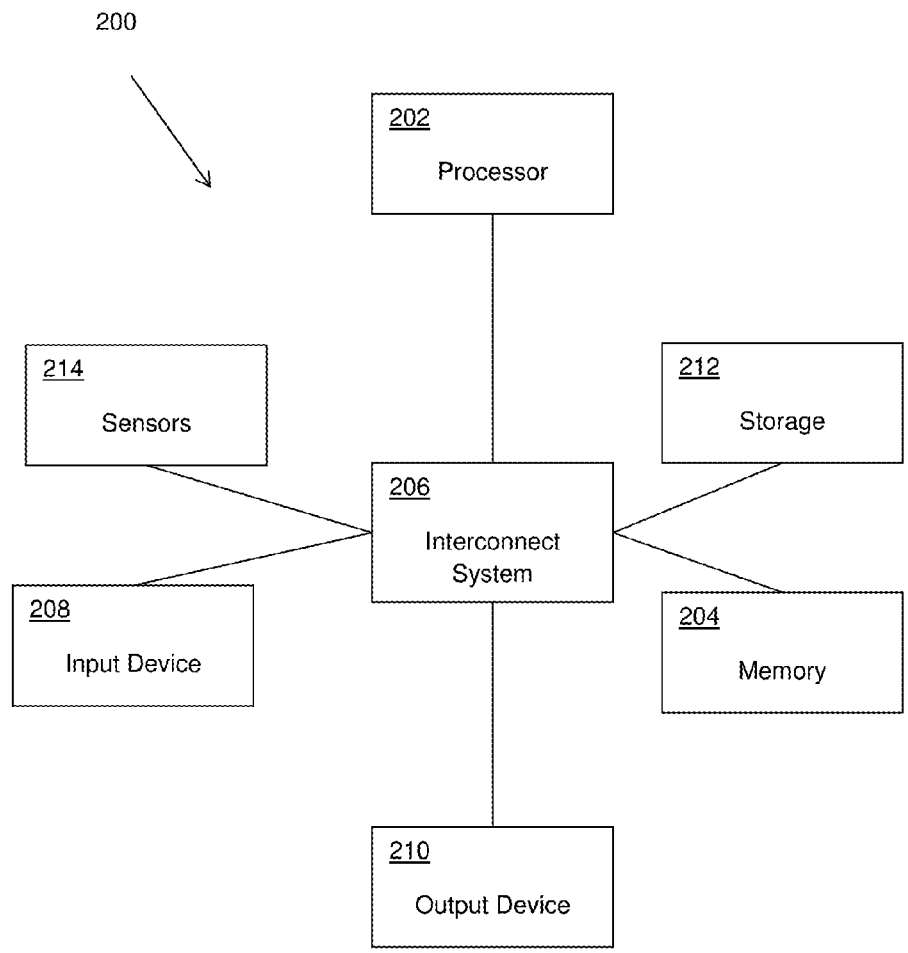
FIG. 2 is a block diagram of a computer system upon which embodiments of a method for treating a contaminated air stream may be performed.

Although computer system 200 is shown by way of example as one type of computer system upon which various aspects and embodiments disclosed herein may be practiced, it should be appreciated that aspects and embodiments disclosed herein are not limited to being implemented on the computer system as shown in FIG. 2. Various aspects and embodiments disclosed herein may be practiced on one or more computers having a different architecture or components that that shown in FIG. 2.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known PENTIUM™ or CORE™ class processors available from the Intel Corporation. Many other processors are available, including programmable logic controllers. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C♯ (C-Sharp). Other object-oriented programming languages may also be used. Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

The controller may be operated under a "fuzzy logic" regime. Fuzzy logic is a problem-solving control system methodology that lends itself to implementation in systems ranging from simple, small, embedded micro-controllers to large, networked, multi-channel PC or workstation-based data acquisition and control systems. It can be implemented in hardware, software, or a combination of both. Fuzzy logic provides a way to arrive at a definite conclusion based upon vague, ambiguous, imprecise, noisy, or missing input information. Fuzzy logic's approach to control problems mimics how a person would make decisions, only much faster.

In a standard bivalent set theory, an object cannot belong to both a set and its complement. When describing temperature, for example, using sets such as "hot" and "cold" a certain temperature value either belongs to the "cold" set or the "hot" set, and never both at the same time. The boundaries of standard sets are exact. However standard bivalent set theory is not descriptive of the real world. In the real world boundaries in sets are not exact and often blur together. Objects can belong to many sets to varying degrees. By using fuzzy logic we can build devices capable of reasoning with fuzzy sets and judge how they should operate or shift from one setting to another even when the criteria for making those changes are hard to define.

In a fuzzy logic algorithm, a crisp input value is first converted to fuzzy sets in a process called "fuzzification." The algorithm then uses rules to associate these fuzzy input sets to fuzzy output sets representing some control value, for example, motor speed.

Fuzzy logic incorporates a rule-based IF X AND Y THEN Z approach to solving a control problem rather than attempting to model a system mathematically. The fuzzy logic model is empirically-based, relying on an operator's experience rather than their technical understanding of the system. For example, rather than dealing with pH control in terms such as "Set_Point=2.0", "pH<1.8", or "pH 1.8<pH<2.2", terms like "IF (process is too acidic) AND (process is getting more acidic) THEN (increase water flow rate to the process)" or "IF (process is too basic) AND (process is getting more basic rapidly) THEN (reduce the water flow rate to the process quickly)" are used. These terms are imprecise and yet very descriptive of what desirably should happen.

Fuzzy logic controllers are typically provided with some numerical parameters to facilitate operation, for example, what is considered significant error and significant rate-of-change-of-error. Exact values of these numerical parameters are usually not critical unless very responsive performance is required in which case empirical tuning would determine them. For example, a pH control system could use a single pH feedback sensor whose data is subtracted from the command signal to compute "error" (a degree of deviation of measured pH from a desired center point of a range of pH values) and then time-differentiated to yield the error slope or rate-of-change-of-error, hereafter called "error-dot". Error might have units of pH and a small error may be considered to be about 0.1 pH units while a large error might be about 0.5 pH units The "error-dot" might then have units of pH units/min with a small error-dot being about 0.2 pH units/min and a large one being about 1.0 pH units/min. These values do not have to be symmetrical and can be altered once the system is operating to improve or optimize performance. Generally, fuzzy logic is inherently robust since it does not require precise, noise-free inputs and can be programmed to fail safely if a feedback sensor quits or is destroyed. The output control is a smooth control function despite a wide range of input variations. Since the fuzzy logic controller processes user-defined rules governing the target control system, it can be modified to improve or alter system performance. New sensors can easily be incorporated into the system simply by generating appropriate governing rules.

In one embodiment, a fuzzy logic controller 175 is interfaced with a biofilter 100. The system comprises a pH monitoring device 180 in contact with the effluent of the biofilter 117. A flow meter 168 is positioned to measure the flow of make-up water 160 but could alternatively be placed along recycle line 176. A control valve 166 is positioned, for example, downstream of the source of make-up water 155 to regulate its flow into recycle line 176 or into the biofilter vessel 120 through inlet 165. The control valve 166 may comprise, for example, an automated control valve such as a motorized valve, a solenoid valve, or a pneumatic valve. The control valve 168 is interfaced with the fuzzy logic controller 175. The pH monitoring device 180 may measure the pH of effluent at one or more points in the system 100, for example, in the sump 117. The controller 175 receives the pH value via an input signal from the pH sensor 180. Based on a pre-determined set point, the controller 175 sends a signal to the control valve 166 that either causes the make-up water flow rate to increase or decrease depending on the pH of the effluent, or causes the flow rate of the recycled effluent in recycle line 176 to increase or decrease, according to an alternative embodiment.

The following examples are given by way of illustration of working one embodiment in actual practice and should not be construed to limit the scope of the presently disclosed aspect and embodiments in any way.

Example-1

Fuzzy Logic Control Scheme

A non-limiting example of a fuzzy logic control scheme for controlling the pH in a trickling biofilter is described as follows. This control scheme is designed to maintain a pH in a biotrickling filter system within a range of +/−0.4 pH units of a set point of 2.0 pH units by adjusting the flow rate of fresh make-up water into the biofilter using a motorized controller actuated valve. Advantages of using a fuzzy logic control scheme in this setting, include:
1. pH behavior is non-linear. Using a fuzzy system circumvents mathematical modeling of the pH behavior of the system.
2. The pH target set point and the allowable threshold of variation can remain as variables in the control logic.

The algorithm of the controller receives two crisp inputs, error and error-dot. Crisp inputs maybe defined herein as actual measured inputs having defined values. Error is calculated by subtracting a measured pH (also referred to as a feedback pH) from the user programmed pH set point. Error-dot is calculated as the change in error over a time period. From these two inputs the algorithm calculates an output control value. In this particular implementation, the output control value corresponds to a change in the position of a motorized control valve on a flow control valve that controls the flow rate of the make-up water into the biofilter. Finally, based on the output control value, the controller sends an output signal to the control valve and the flow rate of make-up water is adjusted accordingly. The algorithm waits for a defined period of time for the changes in the flow of make-up water to be reflected in the system pH, and after this period of time, the algorithm repeats this procedure.

Error, which is the first of the two crisp input variables, is defined as the difference between target pH and measured, or feedback, pH, and may be calculated according to the following equation:

$$\text{Error} = \text{target pH} - \text{feedback pH}.$$

Having obtained the pH measurement and calculated the error, the controller algorithm places the error in one or more fuzzy sets shown in TABLE 1.

TABLE 1

| Fuzzy Error Sets | | |
| --- | --- | --- |
| Set Name | Error Type | Description |
| pH_Low | positive error | Measured pH is lower than target |
| pH_High | negative error | Measured pH is higher than target |
| pH_Good | zero error | Measured pH is same as target |

A characteristic of fuzzy set theory is that the error value need not belong to only one set but may be a member of multiple sets to differing degrees. Membership functions are used to determine the degree to which the calculated error is a member of each of the error sets. Using error as an example, there are three sets that input "error" can belong to: pH_Low, pH_High, and pH_Good. Membership functions define which fuzzy sets a given input belongs to, and the degree to which it belongs to that particular set (degree of membership).

Figure 4:
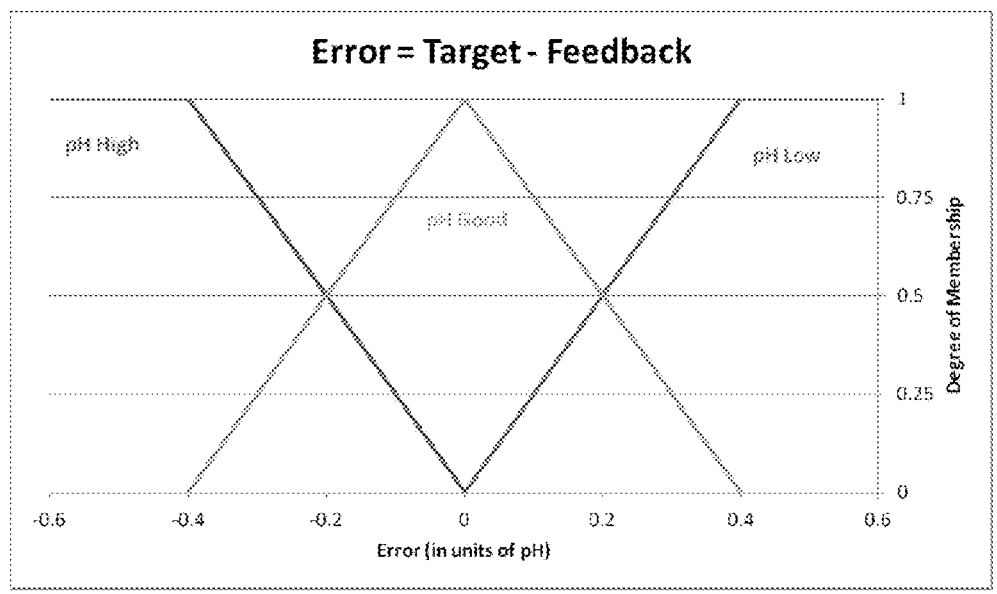
FIG. 4 is a chart relating error with a degree of membership in one or more fuzzy input sets.

FIG. 4 depicts a graph showing the relationship between error and the degree of membership in a fuzzy set. For this example, the predetermined desired pH range is plus/minus 0.4 pH units from the pH set point. Where error is zero, the error belongs one hundred percent in the pH_Good set. Where the error is +0.4 pH or greater, the error belongs one hundred percent in the pH_Low set. (Referring to Equation 1, error is defined as target pH minus measured pH, therefore if the measured pH is below the set point, the error will be positive.) Where the error is −0.4 pH or more negative, the error belongs one hundred percent in the pH_High set. Where the error is 0.0 pH, the error belongs one hundred percent in the pH_Good set.

Where the error is between 0.0 pH and +0.4 pH, the error will be a member of both the pH_Good set and the pH_Low set. The percent membership in the pH_Good set decreases linearly from 100% where error is 0.0 pH to 0% where error is +0.4 pH. Meanwhile, the percent membership in the pH_Low set increases linearly from 0% where error is 0.0 pH units to 100% where error is +0.4 pH units. Analogous relationships apply between the pH_Good set and the pH_High set where error is between −0.4 pH units and 0.0 pH units.

Error-dot, which is the second of the two crisp input variables, is defined as the change in error over a pre-determined time period, and may be calculated according to the following equation:

$$\text{Error-dot} = d\text{Error}/dt$$

The error-dot may belong in three different fuzzy sets shown in TABLE 2.

TABLE 2

| Fuzzy Error-Dot Sets | | |
| --- | --- | --- |
| Set Name | Error Type | Description |
| pH_getting_lower | positive error-dot | Error is changing with positive slope |
| pH_getting_higher | negative error-dot | Error is changing with negative slope |
| pH_no_change | zero error-dot | Error is not changing |

Figure 5:
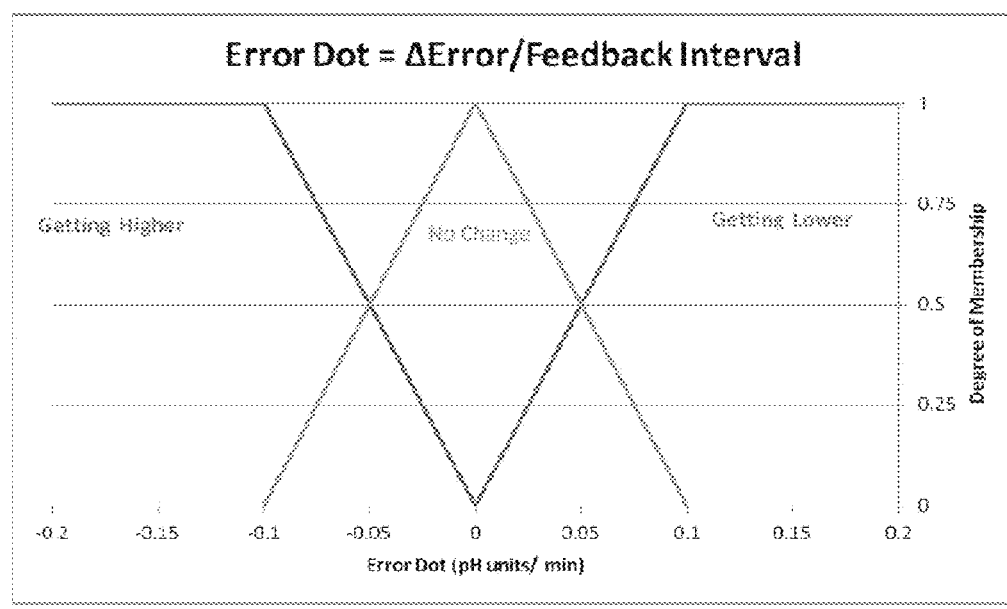
FIG. 5 is a chart relating error-dot with a degree of membership in one or more fuzzy input sets.

FIG. 5 depicts a graph showing the relationship between error-dot and the degree of membership in a fuzzy error dot set. For this example, the pre-determined desired range for error-dot is plus/minus 0.1 delta pH units/minute.

Where the error-dot parameter is +0.1 d error/min or greater, the error-dot parameter belongs one hundred percent in the pH_getting_lower set. Where the error-dot is −0.1 d error/min or more negative, the error-dot parameter belongs one hundred percent in the pH_getting_higher set. Where the error-dot is 0.0 d error/min, the error-dot parameter belongs one hundred percent in the pH_no_change set.

Where the error is between 0.0 d error/min and +0.1 d error/min, the error will be a member of both the pH_no_change set and the pH_getting_lower set. The percent membership in the pH_no_change set decreases linearly from 100% where error is 0.0 d error/min to 0% where error is +0.1 d error/min. Meanwhile, the percent membership in the pH_getting_lower set increases linearly from 0% where error dot is 0.0 d error/min to 100% where error dot is +0.1 d error/min. Analogous relationships apply between the pH_no_change set and the pH_getting_higher set where error dot is between −0.1 d error/min and 0.0 d error/min.

Thus far the controller has received crisp input signals describing pH values of the effluent. The controller used these crisp inputs to calculate error and error dot and determined degrees of membership in the various fuzzy error sets and fuzzy error dot sets based on the inputs and pre-determined ranges. Now that the degrees of membership have been determined, the controller may use this information to determine an output control value.

The output control value determines the output signal delivered to the control valve. Change in control valve position may be calculated as a percentage of total valve span from 0% to +/−100%. A positive percentage represents opening of the valve, and a negative percentage representing a closing of the valve. This percentage is converted to a milliamp change in valve position. For a 4-20 milliamp (mA) actuated valve the total span of movement of the valve is 16 mA, therefore the controller adjusts the current valve position by changing the applied current as a percentage of 16 mA.

A series of steps are performed in the controller algorithm to arrive at an output control value based on the input values. The fuzzy logic controller incorporates a rule-based IF X AND Y THEN Z approach to determining the output control value, rather than relying on a mathematical model of the system, the way other control processes do. The controller uses this rule-based approach to associate input signals with specific output actions.

For this system, there are five fuzzy output sets. Each fuzzy output set has a rule associating it with one or more fuzzy input sets.

Because this system includes five fuzzy output sets, it has five rules, shown in TABLE 3.

TABLE 3

Rules

| Input Fuzzy Set Antecedent condition. If . . . | Output Set Consequent Action. Then . . . |
|---|---|
| pH_Good | Do_Nothing |
| pH_High | Close_fast |
| pH_Low | Open_fast |
| pH_Good AND getting_lower | Open_slow |
| pH_Good AND getting_higher | Close_slow |

Each fuzzy output set is associated with a numerical output value constant. For example, the output set Open_fast is associated with the constant 1.0, which indicates that the output set is associated with opening an associated valve 100%. The output set Do_Nothing is associated with the output set constant, 0, indicating that it corresponds to an output of a 0% change in the valve position. The output set Close_slow is associated with an output in which the valve is closed 50% from its current position. Each of the associated output constants is shown in Table 4.

TABLE 4

Output Set Constants

| Fuzzy Output Set | Associated Fuzzy Output Set Constant |
|---|---|
| Open_valve_fast; | 1.0 |
| Open_valve_slow | 0.5 |
| Do_nothing | 0.0 |
| Close_valve_slow | −0.5 |
| Close_valve_fast | −1.0 |

While there are five fuzzy output sets, ultimately, a single crisp output control signal for controlling the valve must be determined.

This single crisp output signal is determined by calculating a degree of membership for each fuzzy output set and then taking a weighted average of the fuzzy output set constants. The degree of membership in the fuzzy output set serves as the weighting coefficient.

The degree of membership in each respective fuzzy output set, is a function of the degree of membership of the input sets that serve as conditions for the output set.

For example, the rule associated with the Do_nothing output set is:

IF pH Good THEN Do_nothing.

This output results from an input designating that pH error parameter is in a good range. Therefore the degree of membership in the output set Do_nothing is a function of the degree of membership of the fuzzy input set pH_Good.

The logical operations shown in TABLE 5 below are evaluated to determine a degree of membership (and therefore a weighting coefficient) for each of the five fuzzy output sets based on the rule statements. In TABLE 5, "x" corresponds to an error parameter membership value and "y" corresponds to an error-dot parameter membership value.

TABLE 5

Logical Operations

| Logical Operation | Membership Value |
|---|---|
| x AND y (Intersect) | min(x, y) |
| x OR y (Union) | max(x, y) |
| NOT x (Compliment) | 1 − x |

Combining the logical operations shown in TABLE 5 with each associated rule provides the equation for determining the output membership.

For example, the rule governing the Open_slow output set is:

IF pH Good AND Getting_Lower THEN Open_slow.

Because the Open_slow output requires two antecedent conditions, the intersect operation must be performed to determine the degree of membership for the Open_slow output set as follows:

Open_slow degree of membership=min(pH_good membership,Getting_lower membership).

An analogous operation is performed on each of the five output sets.

Once the degree of membership for each fuzzy output set is determined, a weighted average of the fuzzy output set constants is taken, and the result is the output control value. The output control value represents a percentage by with the valve will be opened or closed from its present position. After a predetermined amount of time passes, the process is repeated and a new valve position is determined. The period of time may be determined by a determination of how long it would take a change in make-up water flow to the biofilter to case a steady pH in biofilter to be re-established.

Applying specific values for illustrative purposes, if Feedback pH=1.8, and Target pH=2.0, then Error=Target−Feedback=2.0−1.8=+0.2 pH.

This error value would have the following degrees of membership in the fuzzy error sets:

Membership (pH_high)=0;
Membership (pH_good)=0.5; and
Membership (pH_low)=0.5.

If four minutes earlier the pH reading had been 1.6, then d error/dt=Error-dot=(−0.4−−0.2)/4=−0.05. This error-dot value would have the following degrees of membership:

Membership (Getting_higher)=0.5;
Membership (No_change)=0.5; and
Membership (Getting_lower)=0.

TABLE 6 shows the weighting values for each output set determined from the intersect, union and complement operations found in the rule base evaluated using the corresponding input set degree membership.

TABLE 6

Degrees of Membership in Output Sets

| Rule | Evaluate to find a weighting value for the output set | Degree of Membership (Weighting Value) |
|---|---|---|
| IF pH_Good THEN Do_nothing | MAX (0.5, N/A) | 0.5 |
| IF pH_High THEN Close_fast | MAX (0, N/A) | 0.0 |
| IF pH_Low THEN Open_fast | MAX (0.5, N/A | 0.5 |
| IF pH_Good AND Getting_Lower THEN Open_slow | MIN (0.5, 0) | 0.0 |
| IF pH_Good AND Getting_Higher THEN Close_slow | MIN (0.5, 0.5) | 0.5 |

Evaluating the rule for Do_nothing, the membership value of pH_Good is 0.5, therefore the weighting value for the fuzzy output set of Do_nothing is 0.5.

Evaluating the rule for Close_fast, the membership value of pH_High is zero, therefore the scaling or weighting coefficient for the fuzzy output set of Close_Fast is zero.

Evaluating the rule for Open_fast, the membership value of pH_Low is 0.5, therefore the weighting coefficient for the fuzzy output set of Open_fast is 0.5.

Evaluating the rule for Open_Slow, the membership value for pH_Good is 0.5, while the membership value for Getting_Lower is 0.0. Taking the minimum of these two values, the weighting coefficient for Open_Slow is 0.0.

Evaluating the rule for Close_Slow, the membership value for pH_Good is 0.5, while the membership value for Getting_Higher is also 0.5. Taking the minimum of these two values, the weighting coefficient for Close_Slow is 0.5.

Once the algorithm finds the weighting coefficient of each fuzzy output set by evaluating the rules in the rule base, each fuzzy output set is scaled according to the weight of its corresponding rule. For example, the rule corresponding to the fuzzy output set "do nothing" evaluated to 0.5, so this fuzzy set is scaled to 50%. Once all fuzzy output sets are scaled appropriately, the algorithm calculates the centroid, or center of mass, or the weighted average of output set constants, according to the equation:

$$\frac{\sum_{i=1}^{5} C_i * M_i}{5}$$

where,
i=fuzzy output set;
C=output set constant; and
M=degree of membership.
The sum is divided by the number of output sets, which is five in this case.

Application of the above equation to the given values for this scenario results in an output value of 0.167.

With a low pH of 1.8 (target of pH 2.0) with the pH rising at a rate of 0.05 pH/min, the algorithm therefore responds by opening the valve from its present position by 16.7% of the total valve capacity or span range to increase make-up water flow and raise the pH within the biofilter. The logic takes into consideration both the current state of the system (pH is low) and the behavior of the system (pH is getting higher) to calculate a suitable blended control value for the valve position.

Total valve capacity is span range: 20 mA−4 ma=16 mA. Therefore valve position is increased by:

+16 mA*0.167=+2.672 mA (a crisp output value of the algorithm)

The controller reads the current presently applied to the valve and adds an additional 2.672 mA to further open the valve.

In instances where a full open position of the valve corresponds to an input current of 20 mA, limits are set in the programming so that final valve position is not set higher than 20 mA. When the valve is already opened to its fullest extent in the 20 mA position but the maximum flow rate of water through the valve is not sufficient in raising the feedback pH to the target, the algorithm may recommend the valve position be increased by a value that comes out of the fuzzy logic process, but the actual position of the valve will remain unchanged.

Figure 6:
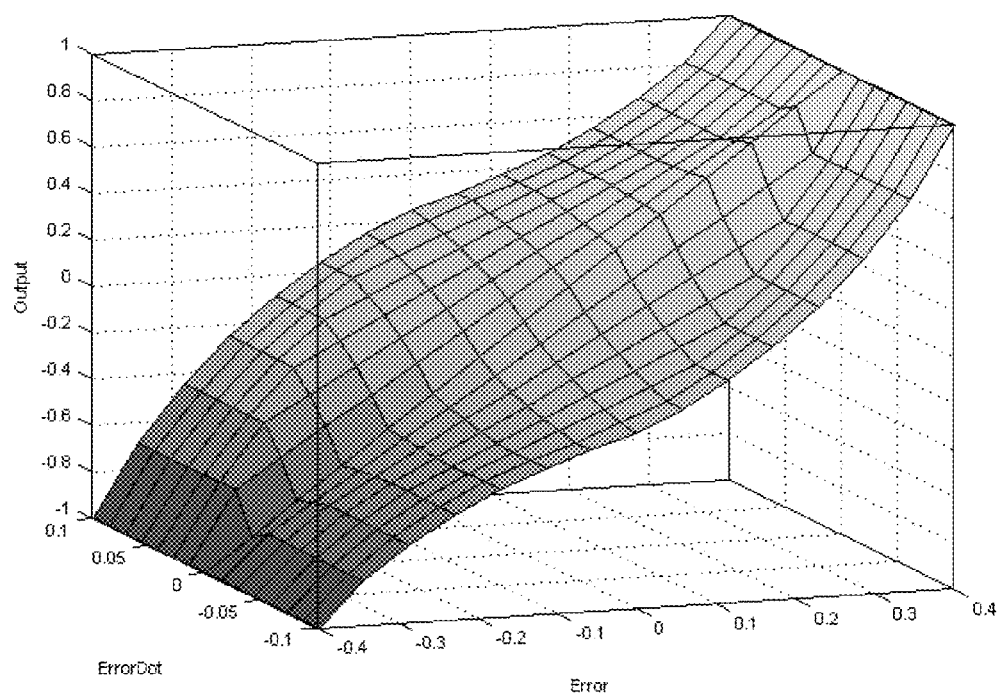
FIG. 6 is a surface map of the output control value for all combinations of error and error-dot for an embodiment of a biofilter as disclosed herein.

FIG. 6 shows the resultant "surface" of the output for all combinations of error and error-dot in the defined range, based on the rules described above. As shown in FIG. 6, the output control value is a function of both the error value and the dot error value.

Example-2

Fuzzy Logic Control Scheme Vs. Fixed Flow Rate

To determine the effectiveness of implementing fuzzy logic control in a biofiltration system, a trickling biofilter was operated under a traditional fixed make-up water scheme, followed by two days of operation under a fuzzy logic scheme.

Figure 7:
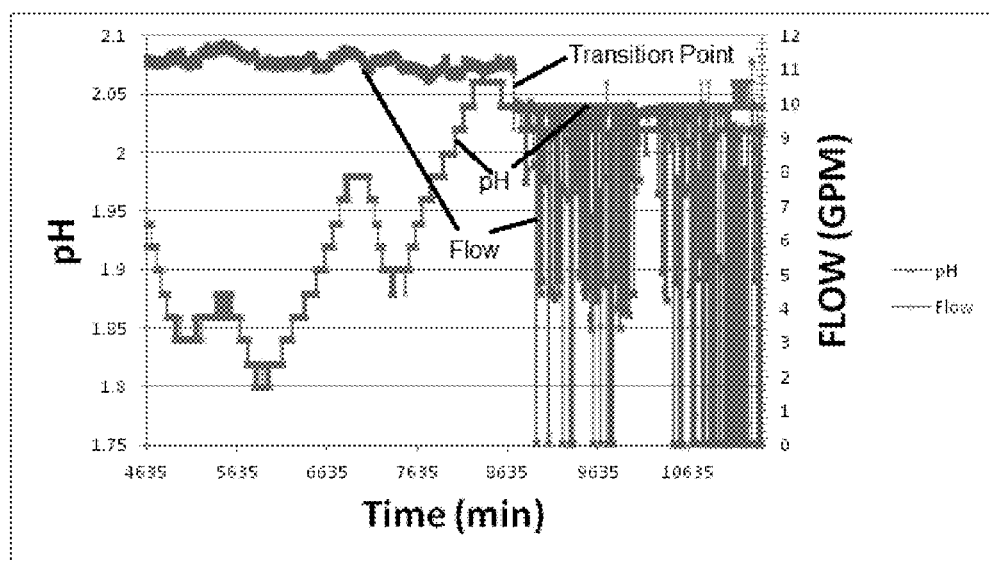
FIG. 7 is chart of data obtained during testing of an embodiment of a biofilter as disclosed herein.

Under the traditional scheme, a fixed flow of make-up water was applied at a rate of 10-12 gallons per minute to a trickling biofilter for a period of approximately six days, and pH readings of the sump effluent were measured, as shown in FIG. 7. During this six day period the pH fluctuated from about 1.8 to about 2.05. The standard deviation in pH measurements for the period was 0.075. Meanwhile, the water flow remained constant. An average flow rate for the period was 11.25 GPM.

Next, a fuzzy logic-based controller was applied to control the flow rate of the water for a two day period. As can be seen in FIG. 7, the range of pH fluctuations was significantly decreased, as the pH was maintained between 2.0 and 2.05 with only temporary deviations out of that range. The standard deviation in pH for this period was 0.0098—an 87% reduction in pH deviation. Meanwhile, the water use for this period fluctuated but was significantly reduced overall. An average flow rate of water during the fuzzy logic period of testing was 6.82 GPM, resulting in a 39% reduction in water use.

As shown by these results the use of a fuzzy logic controller favorably resulted in both reduced water consumption and reduced pH deviation as compared to the traditional make-up fixed flow system. The reduction in water consumption results in less expense and waste in the system. The reduction in pH deviation promotes better microbial growth in the biofilter thereby contributing to improved removal of hydrogen sulfide.

Example-3

Fuzzy Logic Control Scheme Vs. Fixed Flow Rate

To determine the effectiveness of implementing fuzzy logic control in a biofiltration system, a trickling biofilter was operated under a traditional fixed make-up water scheme, followed by two days of operation under a fuzzy logic scheme.

Figure 8:
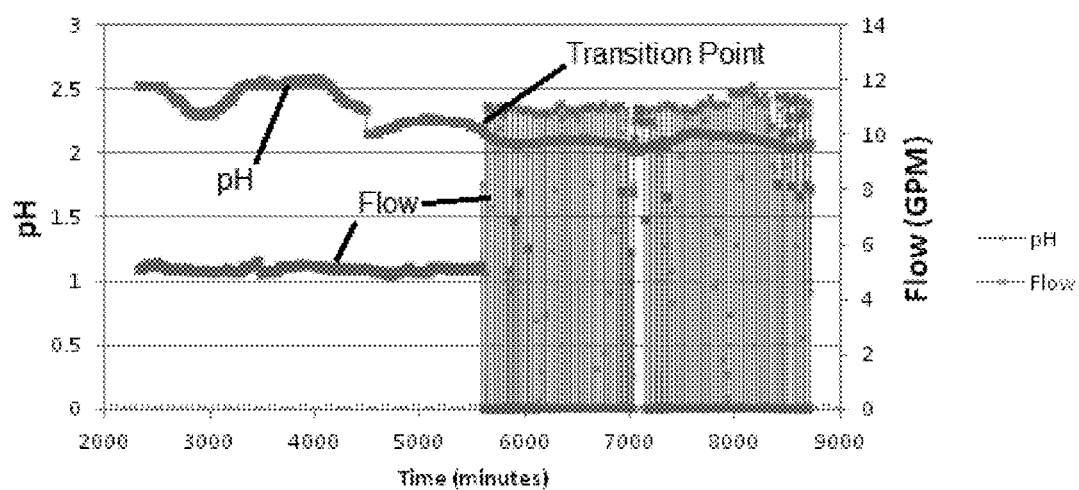
FIG. 8 is another chart of data obtained during testing of an embodiment of a biofilter as disclosed herein.

Under the traditional scheme, a fixed flow of make-up water was applied at a rate of 5.13 gallons per minute to a trickling biofilter for a period of approximately two days, and pH readings of the sump liquid were measured, as shown in FIG. 8. During this two day period the pH fluctuated from about 2.6 to about 2.1, with a standard deviation in pH of 0.137. The average $H_2S$ loading for this period was 442 ppm with an average air flow rate of 400 cubic feet per minute.

Next, a fuzzy logic-based controller was applied to control the flow rate of the water for an additional two day period. As can be seen in FIG. 8, the range of pH fluctuations was significantly decreased, as the pH was maintained in a tight range slightly above 2.0 for that period. The average flow rate of make-up water for the period was 2.02 gallons per minute, only 39% of the water used during the fixed flow portion. The standard deviation in pH during the fuzzy logic period was 0.036, about a quarter of the deviation observed during the fixed flow period. The average $H_2S$ loading for the fuzzy logic period was 477 ppm with an average air flow rate of 400 cubic feet per minute, comparable to that during the fixed flow period, providing a similar basis of comparison for the two systems.

Application of a fuzzy logic controller therefore provided far more effective control of pH with far less make-up water, resulting in less waste and better facilitating the growth of desired microbial species in the biofilter.

Aspects and embodiments disclosed herein are not limited by the type of biofilter, the media used within the biofilter, the type and location of pH monitoring device, the type and location of the control valve and the type of fuzzy logic controller used. It is not limited to the removal of $H_2S$ and can be used to remove any compound capable of being removed by a biofilter. More than one biofilter can be used in a staged configuration. If a staged configuration is used, the parameter of interest, for example, pH, is monitored and controlled from each stage. Multiple fuzzy logic controllers can be used in a staged configuration. An acid and/or a base may be introduced into the make-up water to control the pH.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A controller for a biofiltration system, the controller being configured to:
   receive a first input signal from a measurement device in the biofiltration system corresponding to a first measured value of an input parameter of the biofiltration system;
   calculate a first error value, the first error value being a first difference between the first input signal and a pre-determined set point for the input parameter;
   receive a second input signal from the measurement device in the biofiltration system later in time from the receipt of the first input signal, the second input signal corresponding to a second measured value of the input parameter;
   calculate a second error value, the second error value being a second difference between the second input signal and the pre-determined set point for the input parameter;
   calculate an error-dot value, the error-dot value being the difference between the second error value and the first error value divided by a time interval between the first measured value and the second measured value;
   determine a first degree of membership of the second error value in each of a plurality of error sets, wherein the first degree of membership is based on the second error value and a pre-determined error range;
   determine a second degree of membership of the error-dot value in each of a plurality of error-dot sets, wherein the second degree of membership is based on the error-dot value and a pre-determined error-dot range;
   determine an output control value based on a weighted average of one or more output set constants, each of the output set constants associated with an output set, a weighting of the output set constants based on the first degree of membership of the second error value in each of the plurality of error sets, the second degree of membership of the error-dot value in each of the plurality of error-dot sets, and a pre-determined rule set of conditional statements associating each output set with at least one of an error set and an error-dot set; and
   generate a control signal based on the output control value which regulates an output parameter of the biofiltration system.

2. The controller of claim 1, wherein the output parameter comprises a rate of introduction of a make-up water to the biofiltration system.

3. The controller of claim 2, wherein the control signal controls a valve regulating a rate of introduction of make-up water to the biofiltration system.

4. The controller of claim 3, wherein the input parameter is a pH value of a treatment water effluent.

5. The controller of claim 4, wherein the measurement device is a pH sensor.

6. The controller of claim 3, wherein the input parameter is a hydrogen sulfide concentration at a contaminated air inlet of the biofiltration system.

7. The controller of claim 3, wherein the input parameter is a hydrogen sulfide concentration at a treated air outlet of the biofiltration system.

8. The controller of claim 7, wherein the control signal controls a blower regulating a rate of air flow through the biofiltration system.

9. The controller of claim 1, wherein the output parameter comprises a rate of air flow through the biofiltration system.

10. The controller of claim 1, wherein the input parameter is a nutrient concentration of a treatment water effluent.

11. A wastewater treatment system comprising:
- a contaminated air inlet in fluid communication with a treated air outlet;
- a media bed in fluid communication with and positioned between the contaminated air inlet and the treated air outlet;
- a sump configured and arranged to receive an effluent from the media bed;
- an effluent outlet in fluid communication with the sump;
- a source of make-up water at least periodically in fluid communication with the biofilter; and
- a control system including:
- a pH sensor configured and arranged to measure a pH of the effluent;
- a controller actuated valve positioned between the source of make-up water and the biofilter; and
- a fuzzy logic controller in communication with the pH sensor and the controller actuated valve and configured to provide an output signal to the controller actuated valve to regulate a rate of supply of make-up water to the biofilter in response to a plurality of input signals received from the pH sensor indicative of a pH of the effluent; and
- a liquid mixture inlet in fluid communication with the media bed.

12. The wastewater treatment system of claim 11, wherein the pH sensor is positioned in one of the sump and the recycle flow line.

13. The wastewater treatment system of claim 11, further comprising a drain outlet in fluid communication with the sump.

14. The wastewater treatment system of claim 13, wherein the pH sensor is positioned in the drain outlet.

15. A method of improving the performance of an odor mitigation biofilter, the method comprising:
replacing a manually operated make-up water flow control system of the biofilter with a fuzzy logic based control system configured to regulate flow of make-up water into the biofilter based upon one or more measured parameters of the biofilter, the replacement of the manually controlled make-up water flow control system with the fuzzy logic based control system causing a reduced range of fluctuation of pH within the biofilter over time and a reduced consumption of make-up water by the biofilter.

* * * * *